US005571637A

United States Patent [19]

Idota

[11] Patent Number: 5,571,637
[45] Date of Patent: Nov. 5, 1996

[54] NON-AQUEOUS SECONDARY BATTERY

[75] Inventor: Yoshio Idota, Minami-ashigara, Japan

[73] Assignee: Fuji Photo Film Co., Ltd., Kanagawa, Japan

[21] Appl. No.: 558,873

[22] Filed: Nov. 16, 1995

[30] Foreign Application Priority Data

Nov. 16, 1994 [JP] Japan .................................. 6-282068

[51] Int. Cl.$^6$ ........................................... H01M 4/58
[52] U.S. Cl. ............................................ 429/218; 429/197
[58] Field of Search ..................................... 429/218, 197

[56] References Cited

U.S. PATENT DOCUMENTS

| | | | |
|---|---|---|---|
| 4,076,905 | 2/1978 | Sammells | 429/218 |
| 4,116,780 | 9/1978 | Sammells | 204/2.1 |
| 4,516,317 | 5/1985 | Bailey | 29/623.5 |
| 4,535,037 | 8/1995 | Mcmanis, III et al. | 429/103 |
| 5,139,901 | 8/1992 | Kawaguchi et al. | 429/218 |
| 5,358,805 | 10/1994 | Fujimoto et al. | 429/218 |
| 5,395,711 | 3/1995 | Tahara et al. | 429/218 |
| 5,437,945 | 8/1995 | Omaru et al. | 429/197 |

*Primary Examiner*—Prince Willis, Jr.
*Assistant Examiner*—Carol Chaney
*Attorney, Agent, or Firm*—Sughrue, Mion, Zinn, Macpeak & Seas

[57] ABSTRACT

A non-aqueous secondary battery comprises a positive electrode-active material, a negative electrode material and a non-aqueous electrolyte, wherein the negative electrode material comprises a boron-containing compound, in particular, a compound represented by the following general formula: $SiB_n$ (wherein n ranges from 3.2 to 6.6). The non-aqueous secondary battery ensures high safety and exhibits a high capacity and a high discharge voltage.

6 Claims, 1 Drawing Sheet

NON-AQUEOUS SECONDARY BATTERY

BACKGROUND OF THE INVENTION

The present invention relates to a non-aqueous secondary battery which is highly safe and has a high capacity and a high discharge voltage.

As positive electrode-active materials for non-aqueous secondary battery comprising transition metal oxides, there have been known, for instance, $LiMn_2O$, $Li_2MnO_3$, double oxide of $\gamma$-$\beta MnO_2$ and $LiMn_2O_4$, double oxide of $\gamma$-$\beta MnO_2$ and $Li_2MnO_3$, $LiCoO_2$, $LiCo_{0.5}Ni_{0.5}O_2$, $LiNiO_2$, $V_2O_5$, amorphous $V_2O_5$, $V_6O_{13}$, $LiV_3O_8$, $VO_2(B)$, $TiS_2$, $MoS_2$, $MoO_3$ and $LiMo_2O_4$.

Moreover, typical negative electrode-active materials include, for instance, elemental lithium and lithium alloys. However, if these negative electrode-active materials are used, lithium metal grows like a dendrite in a battery during charging and discharging the same and this results in the formation of an internal short circuit and there may be a possibility of ignition because of high activity of the dendritic metal per se.

As examples of negative electrode-active materials other than elemental lithium, lithium alloys or carbonaceous materials, there have been known, for instance, those capable of absorption and release of lithium such as $TiS_2$, $LiTiS_2$, transition metal oxides each having a rutile structure (for instance, $WO_2$), spinel compounds (e.g., $Li_xFe(Fe_2)O_4$), electrochemically synthesized lithium compounds of $Fe_2O_3$, $Nb_2O_5$, iron oxides (such as FeO, $Fe_2O_3$ and $Fe_3O_4$) and cobalt oxides (such as CoO, $Co_2O_3$ and $Co_3O_4$). All of these compounds can ensure a high redox potential and accordingly, do not provide any non-aqueous secondary battery having a high discharge potential on the order of 3 V and a high capacity. These negative electrode-active materials have such common characteristic properties that they do not basically undergo any change in crystalline structures before and after charging and discharging. On the other hand, there have also been proposed negative electrode-active materials which undergo changes in crystalline structures when they are charged (for instance, when absorbing lithium), but the resulting crystalline structures after the initial charging (for instance, amorphous structure) are basically maintained throughout the subsequent charge and discharge cycle. Examples thereof include $LiCoVO_4$ and $SnSiO_3$.

In addition, Japanese Un-Examined Patent Publication (hereinafter referred to as "J.P. KOKAI") No. Sho 53-136630 discloses negative electrode-active alloy materials: $Li_xSiB_y$ (wherein x ranges from 1 to 5 and y ranges from 0.1 to 3). The patent describes that the compounds are characterized by a redox potential lower than that of a lithium-aluminum alloy, like elemental lithium, and a plurality of stages observed in the lithium-insertion and release potential curve.

SUMMARY OF THE INVENTION

Accordingly, it is an object of the present invention to provide a safe non-aqueous secondary battery ensuring a high capacity and a high discharge voltage.

The inventors of this invention have conducted various studies to accomplish the foregoing object, have found out that it is effective for solving the problems associated with the conventional techniques to use a specific compound as a negative electrode material in a non-aqueous secondary battery which comprises a positive electrode-active material, a negative electrode material and a non-aqueous electrolyte and have thus completed the present invention on the basis of the foregoing finding.

The foregoing object of the present invention can be achieved by providing a non-aqueous secondary battery which comprises a positive electrode-active material, a negative electrode material and a non-aqueous electrolyte wherein the negative electrode material is a boron atom-containing compound, in particular, a compound containing $SiB_4$.

DESCRIPTION OF THE PREFERRED EMBODIMENTS

Figure 1:
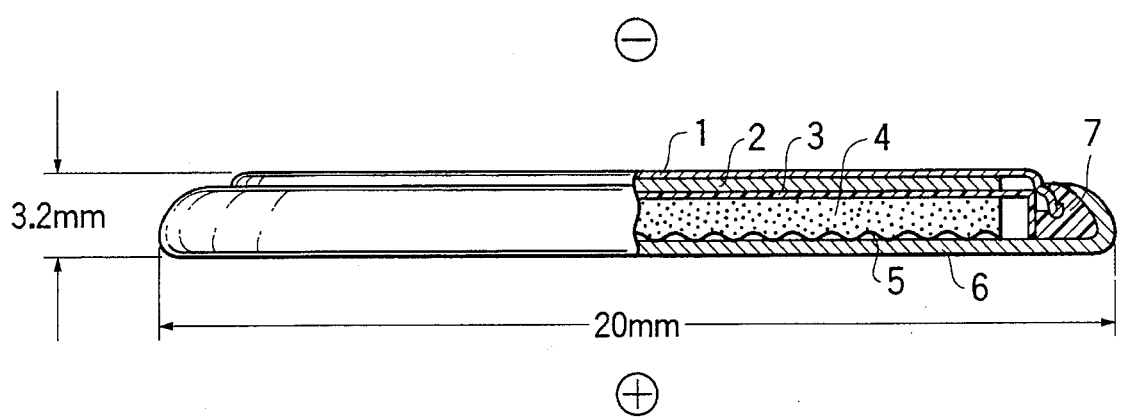
FIG. 1 attached herein is a cross sectional view of a coin-shaped non-aqueous secondary battery as a preferred embodiment of the present invention prepared in Examples.

The non-aqueous secondary battery of the present invention will hereinafter be described in more detail.

First of all, the boron atom-containing compound used in the present invention as a negative electrode material may be any boron atom-containing ceramic and preferably boron atom-containing compounds such as those represented by the following general formula:

$$SiB_n$$

wherein n preferably ranges from 3.2 to 6.6, in particular, 3.2 to 4.8. The value of n defined above means that the boron atom-containing compound used in the invention also embraces the nonstoichiometric compounds of $SiB_4$ and $SiB_6$. In particular, the compound of the foregoing general formula is preferably $SiB_4$. Moreover, the compound used in the invention may partially be oxidized.

The compounds $SiB_4$ and $SiB_6$ may in general be synthesized by heating both elemental components, removing any excess Si using a mixture of hydrofluoric acid and nitric acid, then treating the resulting product with, in order, potassium hydroxide, nitric acid and water and separating the resulting product into $SiB_4$ and $SiB_6$ with potassium hydroxide or nitric acid; or by firing a mixture of $SiO_2$ and element B at a temperature ranging from 1300° to 1500° C. in a reducing atmosphere, but the present invention is not restricted to these specific production methods. Moreover, these compounds may be prepared by washing each commercially available compound with an alkaline aqueous solution.

$SiB_4$ used as a negative electrode material may comprise, in addition to Si and B, a variety of elements, for instance, alkali metals, alkaline earth metals, transition metals, Al, Ga, In, Ge, Sn, Pb, Sb, Bi, P and halogen atoms, which may be used alone or in any combination. The content of these elements preferably ranges from 0 to 30 mole %, in particular, 0 to 20 mole %.

A light metal is incorporated into the negative electrode material used in the present invention in such an amount that the potential approximately reaches the deposition potential of the light metal. For instance, the amount thereof preferably ranges from 50 to 700 mole % and, in particular, 100 to 600 mole % based on the amount of the negative electrode material. It is more preferred that the released amount of the light metal be higher than the inserted amount thereof. The insertion of the light metal is preferably carried out by an electrochemical, chemical or thermal method. The electrochemical method preferably comprises the step of electrochemically inserting the light metal included in the positive electrode-active material into the negative electrode material, or directly electrochemically inserting the light metal or an alloy thereof into the negative electrode material. Examples of the chemical method include those comprising admixing the negative electrode material with the light metal, those comprising bringing the active material into contact with the light metal or those comprising reacting the active material with an organometal of the light metal such as butyl lithium. It is preferred in the present invention to use electrochemical and chemical insertion methods. Particularly preferred light metal is lithium or lithium ion.

The average particle size of the negative electrode material used in the present invention preferably ranges from 0.1 to 100 µm, in particular, 0.5 to 60 µm. The average surface area thereof is preferably in the range of from 1 to 100 $m^2/g$, in particular, 2 to 50 $m^2/g$. The negative electrode material may be pulverized and classified using any known pulverizer and classifying device, such as a mortar and a pestle, a ball mill, a vibrating ball mill, a satellite ball mill, a planetary ball mill, a spin flash jet mill, or a sieve. The pulverization and classification may be carried out by either a dry method or a wet method.

The positive electrode-active material used in the invention may be any compound capable of absorbing and releasing light metal ions and it is selected from, in particular, transition metal oxides and transition metal chalcogenides, with transition metal oxides being preferred and lithium-containing transition metal oxides being particularly preferred. The oxide is preferably synthesized by firing a mixture of a lithium compound with a transition metal compound, as will be detailed below.

Examples of lithium compounds include oxides, oxo-acid salts and halides thereof. Examples of transition metal compounds are oxides of transition metals having 1 to 6 valency, salts thereof and complex salts thereof.

Preferred examples of lithium compounds used in the invention include lithium hydroxide, lithium carbonate, lithium nitrate, lithium sulfate, lithium sulfite, lithium phosphate, lithium tetraborate, lithium chlorate, lithium perchlorate, lithium thiocyanate, lithium formate, lithium acetate, lithium oxalate, lithium citrate, lithium lactate, lithium tartrate, lithium pyruvate, lithium trifluoromethanesulfonate, lithium hexafluorophosphate, lithium fluoride, lithium chloride, lithium bromide and lithium iodide.

Examples of preferred transition metal compounds used in the invention are $TiO_2$, lithium titanate, titanyl acetylacetonate, titanium tetrachloride, titanium tetraiodide, ammonium titanyl oxalate, $VO_d$ (d is 2 to 2.5; the compound having d of 2.5 is vanadium pentoxide), lithium compounds of $VO_d$, vanadium hydroxide, ammonium metavanadate, ammonium orthovanadate, ammonium pyrovanadate, vanadium oxysulfate, vanadium oxytrichloride, vanadium tetrachloride, lithium chromate, ammonium chromate, cobalt chromate, chromium acetylacetonate, $MnO_2$, $Mn_2O_3$, manganese hydroxide, manganese carbonate, manganese nitrate, manganese sulfate, ammonium manganese sulfate, manganese sulfite, manganese phosphate, manganese borate, manganese chlorate, manganese perchlorate, manganese thiocyanate, manganese formate, manganese acetate, manganese oxalate, manganese citrate, manganese lactate, manganese tartrate, manganese stearate, manganese fluoride, manganese chloride, manganese bromide, manganese iodide, manganese acetylacetonate, iron oxides (di and trivalent), triiron tetraoxide, iron hydroxides (di and trivalent), iron chlorides (di and trivalent), iron bromides (di and trivalent), iron iodides (di and trivalent), iron sulfates (di and trivalent), ammonium iron sulfates (di and trivalent), iron nitrates (di and trivalent), iron phosphates (di and trivalent), iron perchlorate, iron chlorate, iron acetate (di and trivalent), iron citrate (di and trivalent), ammonium iron citrate (di and trivalent), iron oxalate (di and trivalent), ammonium iron oxalate (di and trivalent), CoO, $Co_2O_3$, $Co_3O_4$, $LiCoO_2$, cobalt carbonate, basic cobalt carbonate, cobalt hydroxide, cobalt sulfate, cobalt nitrate, cobalt sulfite, cobalt perchlorate, cobalt thiocyanate, cobalt oxalate, cobalt acetate, cobalt fluoride, cobalt chloride, cobalt bromide, cobalt iodide, hexaammine cobalt complex salts (salts with sulfuric acid, nitric acid, perchloric acid, thiocyanic acid, oxalic acid, acetic acid, fluoric acid, chloric acid, bromic acid and iodic acid), nickel oxide, nickel hydroxide, nickel carbonate, basic nickel carbonate, nickel sulfate, nickel nitrate, nickel fluoride, nickel chloride, nickel bromide, nickel iodide, nickel formate, nickel acetate, nickel acetylacetonate, copper oxide (mono and divalent), copper hydroxide, copper sulfate, copper nitrate, copper phosphate, copper fluoride, copper chloride, ammonium copper chloride, copper bromide, copper iodide, copper formate, copper acetate, copper oxalate, copper citrate, niobium oxychloride, niobium pentachloride, niobium pentaiodide, niobium monooxide, niobium dioxide, niobium trioxide, niobium pentoxide, niobium oxalate, niobium methoxide, niobium ethoxide, niobium propoxide, niobium butoxide, lithium niobate, $MoO_3$, $MoO_2$, $LiMo_2O_4$, molybdenum pentachloride, ammonium molybdate, lithium molybdate, ammonium molybdophosphate, molybdenum oxide acetylacetonate, $WO_2$, $WO_3$, tungstic acid, ammonium tungstate and ammonium tungstophosphate.

Examples of particularly preferred transition metal compounds used in the invention are $TiO_2$, ammonium titanyl oxalate, $VO_d$ (d is 2 to 2.5), lithium compounds of $VO_d$, ammonium metavanadate, $MnO_2$, $Mn_2O_3$, manganese hydroxide, manganese carbonate, manganese nitrate, ammonium manganese sulfate, manganese acetate, manganese oxalate, manganese citrate, iron oxide (di and trivalent), triiron tetraoxide, iron hydroxides (di and trivalent), iron acetates (di and trivalent), iron citrates (di and trivalent), ammonium iron citrates (di and trivalent), iron oxalates (di and trivalent), ammonium iron oxalates (di and trivalent), CoO, $Co_2O_3$, $Co_3O_4$, $LiCoO_2$, cobalt carbonate, basic cobalt carbonate, cobalt hydroxide, cobalt sulfate, cobalt nitrate, cobalt oxalate, cobalt acetate, nickel oxide, nickel hydroxide, nickel carbonate, basic nickel carbonate, nickel sulfate, nickel nitrate, nickel acetate, copper oxide (mono and divalent), copper hydroxide, copper acetate, copper citrate, $MOO_3$, $MoO_2$, $LiMo_2O_4$, $WO_2$ and $WO_3$.

Examples of particularly preferred combinations of lithium compounds and transition metal compounds used in the invention are combinations of lithium hydroxide, lithium carbonate and/or lithium acetate with $VO_d$ (d is 2 to 2.5), lithium compounds of $VO_d$, ammonium metavanadate, $MnO_2$, $Mn_2O_3$, manganese hydroxide, manganese carbonate, manganese nitrate, iron oxide (di and trivalent), triiron tetraoxide, iron hydroxides (di and trivalent), iron acetates (di and trivalent), iron citrates (di and trivalent), ammonium iron citrate (di and trivalent), iron oxalate (di and trivalent), ammonium iron oxalate (di and trivalent), CoO, $Co_2O_3$, $Co_3O_4$, $LiCoO_2$, cobalt carbonate, basic cobalt carbonate, cobalt hydroxide, cobalt sulfate, cobalt nitrate, nickel oxide, nickel hydroxide, nickel carbonate, basic nickel carbonate, nickel sulfate, nickel nitrate, nickel acetate, $MoO_3$, $MoO_2$, $LiMo_2O_4$, $WO_2$ and/or $WO_3$.

The positive electrode-active material used in the present invention may be prepared by mixing the foregoing lithium compound and the transition metal compound with a compound capable of enhancing the ionic conductivity of the active material such as $Ca^{3+}$ (for instance, calcium carbonate, calcium chloride, calcium oxide, calcium hydroxide, calcium sulfate, calcium nitrate, calcium acetate, calcium oxalate, calcium citrate and/or calcium phosphate) or an amorphous network structure-forming agent (such as $P_2O_5$, $Li_3PO_4$, $H_3BO_3$, $B_2O_3$ and/or $SiO_2$) and then firing the resulting mixture. Moreover, the foregoing lithium compound and the transition metal compound may be mixed with alkali metal ions such as Na, K or Mg ions and/or a compound containing Si, Sn, Al, Ga, Ge, Ce, In and/or Bi (for instance, oxides, hydroxides, carbonates or nitrates thereof) and then fired to give the positive electrode-active material used in the present invention. In particular, the lithium compound and the transition metal compound is preferably mixed with a compound containing Ca, B or P element and then fired. The amount thereof to be added is not restricted to a specific range, but preferably ranges from 0 to 20 mole %.

Examples of preferred positive electrode-active materials simultaneously used in the present invention are transition metal oxides and transition metal sulfides, with manganese dioxide, vanadium pentoxide, iron oxides, molybdenum oxides, molybdenum sulfides, cobalt oxides, iron sulfides and titanium sulfides being particularly preferred.

Examples of preferred positive electrode-active materials simultaneously used in the present invention other than those listed above include lithium-containing transition metal oxides, in particular, those represented by the general formula: $Li_xM_yO_z$ (wherein M mainly comprises at least one element selected from the group consisting of V, Mn, Fe, Co and Ni; x is 0.05 to 1.2; y is 1 or 2; and z is 1.5 to 5). In addition, the positive electrode-active material may further comprise an alkali metal other than lithium, an alkaline earth metal, a transition metal other than the foregoing M, or an element belonging to Group IIIB to VB of the Periodic Table (such as Al, Ga, In, Ge, Sn, Pb, Sb, Bi). Moreover, the active material may likewise comprise, for instance, P and/or B.

Examples of more preferred positive electrode-active materials of lithium-containing transition metal oxides simultaneously used in the invention are $Li_xCoO_2$, $Li_xNiO_2$, $Li_xCo_aNi_{1-a}O_2$, $Li_xCo_b V_{1-b}O_z$, $Li_xCo_bFe_{1-b}O_z$, $Li_xMn_2O_4$, $Li_xMnO_2$, $Li_xMn_2O_3$, $Li_xMn_bCo_{2-b}O_z$, $Li_xMn_bNi_{2-b}O_z$, $Li_xMn_bV_{2-b}O_z$ and $Li_xMn_b Fe_{1-b} O_z$ (wherein x is 0.05 to 1.2; a is 0.1 to 0.9; b is 0.8 to 0.98; z is 1.5 to 5).

Examples of most preferred positive electrode-active materials of lithium-containing transition metal oxides simultaneously used in the invention are $Li_xCoO_2$, $Li_x NiO_2$, $Li_xCo_aNi_{1-a}O_2$, $Li_xMn_2O_4$ and $Li_xCo_bV_{1-b}O_2$ (wherein x is 0.05 to 1.2; a is 0.1 to 0.9; b is 0.9 to 0.98; 2 is 2.02 to 2.3).

The negative electrode material used in combination with the compound of the present invention may be any compound capable of absorbing and releasing light metal ions and it can be selected from, in particular, light metals and alloys thereof, carbonaceous compounds, inorganic oxides, inorganic chalcogenides, metal complexes and organic polymers. More preferably, it is selected from the group consisting of light metals and alloys thereof, carbonaceous compounds and inorganic oxides. These compounds may be used alone or in any combination. For instance, preferred are combinations of light metals with carbonaceous compounds, light metals with inorganic oxides, and light metal alloys, carbonaceous compounds and inorganic oxides.

The light metal is preferably lithium and the alloy thereof is preferably lithium alloys (such as Li—Al, Li—Al—Mn, Li—Al—Mg, Li—Al—Sn, Li—Al—In, Li—Al—Cd). Preferred carbonaceous compounds are those capable of inserting and releasing lithium ions or lithium metal. The carbonaceous compound is selected from the group consisting of, for instance, naturally occurring graphite, artificially synthesized graphite, vapor phase-grown carbon and carbon obtained through firing of organic substances. The carbonaceous compounds preferably include at least a small quantity of graphite structure. Specific examples of carbonaceous compounds are naturally occurring graphite, petroleum coke, pitch coke, coal, carbon obtained by firing cresol resins, carbon obtained by firing furan resins, carbon obtained by firing polyacrylonitrile fibers, vapor phase-grown graphite, vapor phase-grown carbon and carbon obtained by firing mesophase pitch. In addition, the carbonaceous compound may comprise different kinds of compounds other than carbon. For instance, it may comprise B, P, N and/or S in an amount ranging from 0 to 10% by weight. Moreover, it may further comprise SiC and/or BC.

The inorganic oxide is selected from the group consisting of transition metal oxides and semi-metal oxides. Examples of transition metal are V, Ti, Fe, Mn, Co, Ni and Zn which may be used alone or in any combination. For instance, preferred are $Fe_2O_3$, $Co_2O_3$, $VO_2(B)$, $WO_2$, $WO_3$, $MoO_2$, $MoO_3$ and lithium-containing transition metal oxides. Among these compounds, preferred are those represented by the general formula: $Li_eM_fO_g$ (wherein M is at least one member selected from the group consisting of V, Ti, Mn, Fe, Co, Ni and Zn; e is 0.1 to 3; f is 1 or 2; g is 1 to 5.5).

Among them, particularly preferred are those represented by the formula: $Li_pCo_qV_{1-q}O_r$ (wherein p is 0.1 to 2.5; b is 0 to 1; and z is 1.3 to 4.5).

The semi-metal oxide is selected from oxides mainly comprising elements of Group III to V of the Periodic Table. For instance, it may be, oxides of Al, Ga, si, Sn, Ge, Pb, Sb and Bi and may be used alone or in combination. Specific examples thereof are oxides such as $Al_2O_3$, $Ga_2O_3$, $SiO$, $SiO_2$, $GeO$, $GeO_2$, $SnO$, $SnO_2$, $SnSiO_3$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $Bi_2O_5$, $Li_2SiO_3$, $Li_4Si_2O_7$, $Li_2Si_3O_7$, $Li_2Si_2O_5$, $Li_8SiO_6$, $Li_6Si_2O_7$, $Li_2GeO_3$, $Li_4GeO_4$, $Li_8GeO_6$, $Li_2SnO_3$, $Li_8SnO_6$, $Li_2PbO_3$, $Li_4PbO_4$, $LiBiO_2$, $Li_3BiO_4$, $Li_5BiO_5$, $LiSbO_4$, $Li_4MgSn_2O_7$, $Li_2MgSn_2O_5$, $SnSi_{0.01}O_{1.02}$, $SnP_{0.01}O_{1.03}$, $SnB_{0.3}O_{1.45}$, $SnSi_{0.7}P_{0.3}O_{2.75}$, $SnSi_{0.7}Ge_{0.1}P_{0.2}O_{3.1}$, $SnSi_{0.3}Al_{0.1}P_{0.3}O_{3.1}$ and $SnSi_{0.3}Al_{0.1}B_{0.2}P_{0.3}O_{3.2}$.

The inorganic chalcogenides may be selected from sulfides of the metals and semi-metals listed above in connection with the inorganic oxides. For instance, preferred are sulfides such as $TiS_2$, $GeS$, $GeS_2$, $SnS$, $SnS_2$, $PbS$, $PbS_2$, $Sb_2S_3$, $Sb_2S_5$ and $SnSiS_3$. Among these, preferred are compounds containing $SnO$, $SnO_2$, $GeO$, $GeO_2$, $SnSiO_3$ and/or $Li_2SnO_3$. Moreover, it is preferred to add an amorphous network structure-forming agent to the oxides of Group III to V elements. For instance, the oxide preferably comprises an oxide of B, P, Si and/or V. The negative electrode-active material is preferably synthesized in the presence of, for instance, $P_2O_5$, $Li_3PO_4$, $H_3BO_3$, $B_2O_3$, $SiO_2$ and $V_2O_5$. Specific examples include compounds such as $SnP_{0.01}O_{1.03}$, $SnB_{0.3}O_{1.45}$, $SnSi_{0.7}P_{0.3}O_{2.75}$, $SnSi_{0.7}Ge_{0.1}P_{0.2}O_{3.1}$, $SnSi_{0.3}Al_{0.1}P_{0.3}O_{3.1}$ and $SnSi_{0.3}Al_{0.1}B_{0.2}P_{0.3}O_{3.2}$ listed above.

The foregoing carbonaceous compounds and oxides are preferred as the negative electrode-active materials used in the present invention. This is because they can provide a non-aqueous secondary battery having a high capacity, a high discharge voltage, high safety and high charge-discharge cycle life.

The surface of the oxide used in the present invention as the positive or negative electrode-active material may be covered with an oxide having a chemical formula different from that of the positive or negative electrode-active material. The surface-coating oxide is preferably an oxide comprising an acidic and alkaline soluble compound. Moreover, a metal oxide having high electron-conductivity is preferably used as such an oxide. For instance, it is preferred to use $SiO_2$, $PbO_2$, $Fe_2O_3$, $SnO_2$, $In_2O_3$, $ZnO$ or these oxides doped with dopants (such as metals each having a valency different from the metal constituting the oxide, in case of oxides, and halogen atoms), with $SiO_2$, $SnO_2$, $Fe_2O_3$, $ZnO$ and $PbO_2$ being particularly preferred.

The amount of the surface-treated metal oxide preferably ranges from 0.1 to 10% by weight, in particular 0.2 to 5% by weight and most preferably 0.3 to 3% by weight based on the active material.

Moreover, the surface of the positive and negative electrode-active materials may be modified. For instance, the surface of the metal oxide may be subjected to a treatment with an esterifying agent, a chelating agent, a conductive polymer and/or polyethylene oxide.

In addition, the surface of the negative electrode material may be modified. For instance, the surface may be modified by application of a layer of an ion-conductive polymer or polyacetylene. Furthermore, the positive and negative electrode-active materials may be subjected to a purification step such as a water washing step.

The particle size of the positive and negative electrode-active materials is not restricted to any specific range, but preferably ranges from 0.1 to 50 μm and more preferably 0.5 to 30 μm.

The negative electrode material having a desired particle size may be prepared through the use of any known pulverizer and classifying device, such as a mortar and a pestle, a ball mill, a vibrating ball mill, a satellite ball mill, a planetary ball mill, a spin flash jet mill, or a sieve. The pulverization and classification may be carried out by a dry or wet method.

The chemical formula of the compound obtained through the firing is determined by the inductive coupled plasma (ICP) emission spectroscopic analysis and a simplified method in which the chemical formula is estimated from the difference between the weights of powdery products determined before and after the firing.

Additives such as a conductivity-imparting agent, a binder and/or a filler may be incorporated into the depolarizing mix for electrodes used herein.

The conductivity-imparting agent may be any electron-conductive material which does not undergo any chemical change in the assembled battery. In general, the depolarizing mixes for electrodes may comprise at least one conductive material selected from the group consisting of naturally occurring graphite (such as scaly graphite, flaky graphite and clayey graphite), artificial graphite, carbon black, acetylene black, ketchen black, carbon fibers, powdery metals (such as copper, nickel, aluminum and silver), metal fibers, polyphenylene derivatives and mixtures thereof. In particular, the use of graphite is preferred because the resulting battery exhibits improved charge-discharge cycle life. Moreover, the use of the combination of graphite and acetylene black is particularly preferred.

The amount of the conductivity-imparting agent to be incorporated into the depolarizing mix for electrodes is not restricted to a specific range, but preferably ranges from 1 to 50% by weight, in particular, 1 to 30% by weight based on the total weight of the depolarizing mix. In particular, the amount is preferably 1 to 15% by weight, more preferably not less than 1% by weight and less than 5% by weight in case of carbon and graphite. It is preferred to use graphite alone or a mixture of graphite and carbon black wherein the weight ratio of graphite to carbon black preferably ranges from 10/1 to 1/1, in particular, 5/1 to 2/1.

As the binder, there may be used, for instance, polysaccharides, thermoplastic resins and polymers exhibiting rubber elasticity, which may be used alone or in any combination. Examples of preferred binders are starch, polyvinyl alcohol, carboxymethyl cellulose, hydroxypropyl cellulose, regenerated cellulose, diacetyl cellulose, polyvinyl chloride, polyvinyl pyrrolidone, poly(tetrafluoroethylene), poly(vinylidene fluoride), polyethylene, polypropylene, ethylene-propylene-diene terpolymer (EPDM), sulfonated EPDM, styrene-butadiene rubber, polybutadiene, fluororubber and polyethylene oxide. In this respect, when using a compound such as a polysaccharide carrying functional groups reactive with lithium, it is preferred to deactivate the functional groups through the addition of a compound having a group reactive therewith such as an isocyanate group. The amount of the binder to be added is not restricted to a specific range, but preferably ranges from 1 to 50% by weight, in particular, 2 to 30% by weight based on the total weight of the depolarizing mix. The binder may uniformly or non-uniformly be distributed in the depolarizing mix.

The filler usable herein may be any fibrous material which does not undergo any chemical change in the assembled battery. In general, the depolarizing mix for electrodes may comprise, as such a filler, olefinic polymers such as polypropylene and polyethylene; and/or fibers of, for instance, glass and carbon. The amount of the filler is not restricted to a specific range, but preferably ranges from 0 to 30% by weight on the basis of the total weight of the depolarizing mix for electrodes.

The electrolyte in general comprises a solvent and a lithium salt soluble in the solvent (anions and lithium cations). Examples of the solvents include aprotic organic solvents such as propylene carbonate, ethylene carbonate, butylene carbonate, dimethyl carbonate, diethyl carbonate, γ-butyrolactone, methyl formate, methyl acetate, 1,2-dimethoxyethane, tetrahydrofuran, 2-methyltetrahydrofuran, dimethylsulfoxide, 1,3-dioxolan, formamide, dimethylformamide, dioxolan, acetonitrile, nitromethane, ethyl monoglyme, phosphoric acid triester, trimethoxyethane, dioxolan derivatives, sulfolane, 3-methyl-2-oxazolidinone, propylene carbonate derivatives, tetrahydrofuran derivatives, ethyl ether and 1,3-propanesultone, which may be used alone or in combination.

As the counterpart (anions) of lithium in the lithium salt soluble in these solvents may be, for instance, $ClO_4^-$, $BF_4^-$, $PF_6^-$, $CF_3SO_3^-$, $CF_3CO_2^-$, $AsF_6^-$, $SbF_6^-$, $(CF_3SO_2)_2N^-$, $B_{10}Cl_{10}^{2-}$, $(1,2\text{-dimethoxyethane})_2ClO_4^-$, lower aliphatic carboxylate ions, $AlCl_4^-$, $Cl^-$, $Br^-$, $I^-$, anion of chloroboran compounds, and tetraphenyl borate ions, which may be used alone or in combination. Among these, the electrolyte preferably comprises ethylene carbonate. Preferred are electrolytes comprising a mixture of ethylene carbonate and a proper amount of propylene carbonate, 1,2-dimethoxyethane, dimethyl carbonate or diethyl carbonate and $LiCF_3SO_3$, $LiClO_4$, $LiBF_4$, and/or $LiPF_6$. In particular, these supporting electrolytes preferably comprise $LiPF_6$.

The amount of these electrolytes to be incorporated into the battery is not restricted to a specific range, but is appropriately determined depending on the amounts of positive and negative electrode-active materials and the size of the desired battery.

The volumetric ratio of a solvent mixture is not likewise limited to a specific range, but in case of a mixed solvent comprising ethylene carbonate and 1,2-dimethoxyethane and/or diethyl carbonate, the ratio of ethylene carbonate to the latter (1,2-dimethoxyethane and/or diethyl carbonate) preferably ranges from 0.4/0.6 to 0.6/0.4 (when the mixed solvent comprises both 1,2-dimethoxyethane and diethyl carbonate, the ratio of the former to the latter ranges from 0.4/0.6 to 0.6/0.4). When propylene carbonate is added, the amount thereof preferably ranges from 1 to 20% by volume.

The concentration of a supporting electrolyte is not restricted to a particular range, but preferably in the range of from 0.2 to 3 moles per liter of the electrolyte solution.

Moreover, the following solid electrolytes may be used in combination with the foregoing electrolyte solutions.

The solid electrolytes may be classified into inorganic solid electrolytes and organic solid electrolytes. Examples of well known inorganic solid electrolytes usable in the present invention include nitride, halides and oxo acid salts of lithium. Among these, effectively used herein are $Li_3N$, $LiI$, $Li_5NI_2$, $Li_3N$—$LiI$—$LiOH$, $Li_4SiO_4$, $Li_4SiO_4$—$LiI$—$LiOH$, $x\ Li_3PO_4$—$(1-x)\ Li_4SiO_4$, $Li_2SiS_3$, and phosphorus sulfide compounds.

On the other hand, examples of organic solid electrolytes effectively used herein are polyethylene oxide derivatives or polymers comprising polyethylene oxide derivatives; polypropylene oxide derivatives or polymers comprising polypropylene oxide derivatives; ionizable group-containing polymers; mixtures of ionizable group-containing polymers and the foregoing aprotic electrolytes; polymers of phosphoric acid esters; and polymer matrix materials comprising aprotic polar solvents. Alternatively, it has also been known to use an electrolyte to which polyacrylonitrile is added or to use a combination of inorganic and organic solid electrolytes.

The non-aqueous secondary battery of the present invention further comprises a separator. The separators usable herein are, for instance, microporous thin films having a high ion-permeability, a desired mechanical strength and insulating properties. In addition, the separator preferably shows such a function that it closes the pores at a temperature of not less than 80° C. to thus increase the resistance. Examples thereof include sheets and non-woven fabrics of olefinic polymers such as polypropylene and/or polyethylene or glass fibers because of their high resistance to organic solvents and hydrophobicity. The pore size of the separator falls within the range generally used in the field of batteries. For instance, it ranges from 0.01 to 10 μm. The thickness of the separator also falls within the range generally adopted in the field of batteries. For instance, it ranges from 5 to 300 μm. The separator may be prepared by synthesizing a polymer and then forming micropores by a dry method, a drawing method, a solution method, a solvent-removing method or any combination thereof.

Other compounds may be added to the electrolyte in order to improve the discharge and/or charge-discharge characteristics of the resulting battery. Examples of such compounds are pyridine, triethyl phosphite, triethanolamine, cyclic ethers, ethylenediamine, n-glyme, hexaphosphoric acid triamide, nitrobenzene derivatives, sulfur, quinoneimine dyes, N-substituted oxazolidinones and N,N'-substituted imidazolidinones, ethylene glycol dialkyl ethers, quaternary ammonium salts, polyethylene glycol, pyrrole, 2-methoxyethanol, $AlCl_3$, monomers of conductive polymer depolarizing mix for electrodes, triethylene phosphoramide, trialkyl phosphines, morpholine, aryl compounds carrying carbonyl groups, crown ethers such as 12-crown-4, hexamethyl phosphoric triamide and 4-alkylmorpholine, dicyclic tertiary amines, oils, quaternary phosphonium salts and tertiary sulfonium salts.

A halogen atom-containing solvent such as carbon tetrachloride or trifluorochloroethylene may be added to the electrolyte to make the electrolyte noncombustible (J.P. KOKAI No. Sho 48-36632). In addition, carbon dioxide gas may be added to the electrolyte in order to impart good storability at a high temperature to the electrolyte (J.P. KOKAI No. Sho 59-134567).

Moreover, the depolarizing mix for positive and negative electrodes may comprise an electrolyte solution or an electrolyte. There has been known, for instance, a method which comprises adding the foregoing ion-conductive polymer, nitromethane (J.P. KOKAI No. Sho 48-36633) or an electrolyte solution (J.P. KOKAI No. Sho 57-124870) to the depolarizing mix for electrodes.

A current collector for the electrode-active material may be any electron conductor which does not undergo any chemical change in the assembled battery. Examples of materials for current collectors for positive electrodes are stainless steel, nickel, aluminum, titanium, carbon and those obtained by treating the surface of, for instance, aluminum and stainless steel with carbon, nickel, titanium or silver, with aluminum and aluminum alloys being particularly preferred. Examples of materials for current collectors for negative electrodes are stainless steel, nickel, copper, titanium, aluminum, carbon, those obtained by treating the surface of, for instance, copper and stainless steel with carbon, nickel, titanium or silver and Al—Cd alloys, with copper and copper alloys being particularly preferred. The surface of these materials may optionally be oxidized. The current collector may have any shape such as foils, films, sheets, nets, punched sheets, lath bodies, foamed sheets and molded bodies of fibers. The thickness thereof is not limited to a particular range, but in general ranges from 1 to 500 μm.

The non-aqueous secondary battery of the present invention may have any shape such as coin, button, sheet, cylinder, flat and square shapes.

If the battery has a coin or button-like shape, the depolarizing mixes for positive and negative electrode-active materials are mainly compression-molded into pellet-like shapes prior to the practical use. The thickness and diameter of the pellet are determined on the basis of the size of each finally assembled battery. On the other hand, if the battery has a sheet, cylinder or square shape, the depolarizing mixes for positive and negative electrode-active materials are mainly applied (or coated) onto a current collector, dried and compressed prior to the practical use. The active materials may be applied according to any method currently used in this field, for instance, reverse-roll coating, direct-roll coating, blade coating, knife coating, extrusion coating, curtain coating, gravure coating, bar coating, dip coating and squeeze roll coating, with the blade, knife and extrusion coating methods being preferred. The coating operation is preferably carried out at a coating speed ranging from 0.1 to 100 m/min. In this respect, the coated layer may have excellent surface conditions if the coating method is selected from those listed above depending on the physical properties of the solution of the depolarizing mix and the drying characteristics thereof. The sides of the current collector may separately or simultaneously be coated with the depolarizing mix. Moreover, the coating operation may continuously or intermittently be carried out, or the depolarizing mix may be applied to the current collector in a striped pattern. The thickness, length and width thereof are likewise determined depending on the size of each finally assembled battery, but the thickness of the layer coated on each side particularly preferably ranges from 1 to 2000 μm as determined after drying and compressing.

The pellet or sheet can be dried or dehydrated by the currently adopted methods. Particularly preferred drying or dehydrating methods are, for instance, hot air, vacuum, infrared, far infrared, electron beam and low humidity air drying methods which may be used alone or in any combination. The drying temperature preferably ranges from 80° to 350° C., in particular 100° to 250° C. The overall moisture content of the whole battery is preferably not more than 2000 ppm and the depolarizing mixes for positive and negative electrodes and the electrolyte preferably have a moisture content of not more than 500 ppm, respectively, from the viewpoint of charge-discharge cycle characteristics (or cycle life).

The pellet and sheet may be compressed according to the methods currently adopted, but preferred are mold pressing and calender pressing methods. The pressure during pressing is not restricted to a specific range, but preferably ranges from 0.2 to 3 t/cm$^2$. The pressing speed in the calender pressing method preferably ranges from 0.1 to 50 m/min. The temperature during pressing preferably ranges from room temperature to 200° C. The ratio of the width of the positive electrode sheet to that of the negative electrode sheet preferably ranges from 0.9 to 1.1, in particular 0.95 to 1.0. The ratio of the content of the positive electrode-active material to that of the negative electrode material varies depending on the kinds of compounds and the formulations of the depolarizing mixes and cannot clearly be defined, but can be set at a level while taking into consideration the capacity, the charge-discharge cycle life and safety of the finally assembled battery.

The sheets of the depolarizing mixes are put in layers through a separator, then wound or folded, inserted into a can, followed by electrical connection of the can to the sheets, injection of an electrolyte solution and sealing of the can with a sealing plate to complete a battery. In this respect, a safety valve may be used instead of the sealing plate. The battery of the present invention may likewise be provided with conventionally known various safety elements in addition to the safety valve. For instance, fuse, bimetallic element and/or PTC element may be used as overcurrent-inhibitory elements. In addition to the safety valve, as a means for preventing any increase in the internal pressure of the battery can, there may be used, for instance, a method for making cuts on the battery can, a method for making cuts on a gasket, a method for making cuts on the sealing plate or a method for cutting lead plates. Moreover, a protective circuit provided with a built-in measure for preventing any overcharge and/or overdischarge can be incorporated into a charging device or a separate protective circuit may be connected to the charging device. Moreover, the battery may be provided with a system for cutting off the current in response to an increase in the internal pressure of the battery. In this respect, a compound capable of increasing the internal pressure may be incorporated into the depolarizing mixes or the electrolyte. Examples of such compounds are carbonates such as $Li_2CO_3$, $LiHCO_3$, $Na_2CO_3$, $NaHCO_3$, $CaCO_3$ and $MgCO_3$.

The battery can and lead plates used in the present invention may be prepared from conductive metals and alloys. Examples thereof include metals such as iron, nickel, titanium, chromium, molybdenum, aluminum and copper as well as alloys thereof. The cap, can, sheets and lead plates may be welded by any known method (such as direct or alternating current electric welding, laser welding and ultrasonic welding). As sealing agents for sealing the battery, there may be used, for instance, conventionally known compounds and mixtures such as asphalt.

The preferred combinations of the components for the battery in the present invention are of course those of the aforementioned preferred chemical materials and parts for assembling the battery, but particularly preferably the positive electrode-active material comprises at least one compound selected from the group consisting of $Li_xCoO_2$, $Li_xNiO_2$, $Li_xMnO_2$ and $Li_xMn_2O_4$ (wherein x is 0.05 to 1.2); the conductivity-imparting agent comprises only a carbonaceous compound obtained by firing furan resins and/or cresol resins, or a combination of the carbonaceous compound with acetylene black; the current collector for positive electrode is prepared from stainless steel or aluminum and formed into a net, sheet, foil or lath shape; the negative electrode material may comprise a compound containing $SiB_4$ as a principal component as well as a mixture of the compound with at least one member selected from the group consisting of elemental lithium, lithium alloys (such as Li—Al), carbonaceous compounds, oxides (such as $LiCoVO_4$, $SnO_2$, $SnO$, $SiO$, $GeO_2$, $GeO$, $SnSiO_3$, $SnSi_{0.3}Al_{0.1}B_{0.2}P_{0.3}O_{3.2}$) and sulfides (such as $TiS_2$, $SnS_2$, $SnS$, $GeS_2$ and $GeS$); the current collector for negative electrode is prepared from stainless steel, copper or nickel and formed into a net, sheet, foil or lath shape; and the depolarizing mixes used in combination with the positive and negative electrode-active materials or the negative electrode material may comprise a carbon material such as acetylene black or graphite as an electron-conducting agent.

Moreover, the binder used in preferred embodiments of the present invention may be fluorine atom-containing thermoplastic compounds such as poly(vinylidene fluoride), poly (ethylene fluoride), acrylic acid moiety-containing polymers, styrene-butadiene rubber and elastomers such as ethylene-propylene terpolymers, which may be used alone or in combination; the electrolyte solution comprises ethylene carbonate or a combination of ethylene carbonate with a cyclic or non-cyclic carbonate such as diethyl carbonate or dimethyl carbonate or an ester compound such as ethyl acetate; the supporting electrolyte preferably comprises $LiPF_6$ or a combination of $LiPF_6$ with a lithium salt such as $LiBF_4$ or $LiCF_3SO_3$; the separator preferably comprises polypropylene, polyethylene or combination thereof; and the assembled battery may have a coin, button, cylinder, flat or square shape. Moreover, the battery is preferably provided with a means for ensuring safety upon malfunction of the battery (such as an internal pressure-releasing type safety valve, a current-cutting off type safety valve or a separator whose resistance increases at a high temperature).

The non-aqueous secondary battery of the present invention is not limited to particular use and may be applied to electronic machinery and tools such as color note type personal computers, monochrome note type personal computers, subnote type personal computers, pen-input type personal computers, pocket (palm-top) personal computers, notebook type word processors, pocket word processors, electronic book-players, portable telephones, secondary telephones for cordless telephones, pagers, handy terminals, portable facsimile telegraphs, portable copying machines, portable printers, headphone stereo players, video movie-players, liquid crystal televisions, handy cleaners, portable CD-players, mini-disks, electric shavers, electronic translators, mobile telephones, transceivers, motor-driven tools, electronic notebooks, electronic calculators, memory cards, tape recorders, radios and back-up power sources; and daily necessaries such as motor cars, motor-driven cars, motors, lighting equipments, toys, machinery and tools for games, road conditioners, electric irons, watches, strobo lighting equipments, cameras and medical machinery and tools (such as pacemakers, hearing aids and kneaders). Moreover, the battery may likewise be used for a variety of munitional and space developmental machinery and tools. Furthermore, the battery of the present invention can be used in combination with other secondary batteries, solar batteries and/or primary batteries.

According to the present invention, a compound comprising a borom atom-containing compound, in particular, $SiB_n$ (wherein n is 3.2 to 6.6) is used in the negative electrode material for a non-aqueous secondary battery which comprises a positive electrode-active material, a negative electrode material and a non-aqueous electrolyte and as a result, the present invention permits the production of a non-aqueous secondary battery ensuring high safety and exhibiting a high capacity and a high discharge voltage.

The present invention will hereinafter be described in more detail with reference to the following Examples, but the present invention is not limited to these specific Examples.

EXAMPLE 1

A negative electrode pellet was prepared by mixing 88% by weight of $SiB_4$ as a negative electrode material, 6% by weight of flaky graphite and 3% by weight of acetylene black as conductivity-imparting agents, and 3% by weight (solid content) of an aqueous dispersion of poly(vinylidene fluoride) as a binder to give a depolarizing mix for negative electrode, followed by compression-molding the depolarizing mix into a negative electrode pellet (13 mm $\Phi$, 0.08 g), sufficient dehydration of the pellet by a far infrared heater in a dry box (dew point: $-40°$ to $-70°$ C.; dry air) and the resulting dried pellet was used as a negative electrode pellet.

The resulting negative electrode material comprising $SiB_4$ was inspected for the charge-discharge quality of $SiB_4$ using a lithium-aluminum alloy (80–20% by weight; 15 mm$\Phi$, 0.6 mm thick) as the counter electrode (or positive electrode). The test was carried out by allowing insertion and release of lithium at a current of 2 mA. The test was initiated by the insertion of lithium into $SiB_4$. The results thus obtained are summarized in the following Table 1.

EXAMPLE 2

A positive electrode pellet was prepared by mixing 90% by weight of $LiCoO_2$ as a positive electrode-active material, 5% by weight of a carbonaceous compound obtained by firing a furan resin and 1% by weight of acetylene black as conductivity-imparting agents, and 3% by weight (solid content) of an aqueous dispersion of poly(vinylidene fluoride) and 1% by weight of carboxymethyl cellulose as binders to form a depolarizing mix for positive electrode, followed by compression-molding the depolarizing mix into a positive electrode pellet (13 mm $\Phi$, 0.35 g) and sufficient dehydration of the pellet by a far infrared heater in a dry box identical to that used in Example 1 and the resulting dried pellet was used as a positive electrode pellet.

The negative electrode pellet used herein was identical to that used in Example 1 in which $SiB_4$ was used as the negative electrode material.

As a current collector for both positive and negative electrode cans, a net of SUS316 having a thickness of 80 μm was used and it was connected to each coin-like can through welding. A 1 mole/l $LiPF_6$ solution (in 2:8 (volume ratio) ethylene carbonate/diethyl carbonate mixed solvent; 2.00 μl) was used as an electrolyte, and microporous polypropylene sheet and polypropylene nonwoven fabric which were impregnated with the electrolyte were used as separators. A coin-like lithium battery having a structure as shown in FIG. 1 was produced in a dry box identical to that used above.

In FIG. 1, a negative electrode pellet 2 of a depolarizing mix therefor is sealed between a negative electrode sealing plate 1 and a separator 3, a positive electrode pellet 4 of a depolarizing mix therefor is sealed between a positive electrode can 6 provided with a current collector 5 and the separator 3 and a gasket 7 is arranged between the outer edge of the negative electrode sealing plate 1 and the outer edge of the positive electrode can 6.

The battery thus produced was subjected to charge-discharge cycles at a current of 2 mA and a voltage ranging from 4.2 to 2.7 V. The test was initiated by charging the battery. The results thus obtained are listed in the following Table 2.

Comparative Example 1

As a negative electrode material outside the scope of the present invention, a negative electrode pellet was prepared by mixing 94% by weight of artificial graphite, 3% by weight of acetylene black as conductivity-imparting agents and 3% by weight (solid content) of an aqueous dispersion of poly(vinylidene fluoride) as a binder to give a depolarizing mix for negative electrode, followed by compression-molding the depolarizing mix into a negative electrode pellet (13 mm$\Phi$, 0.08 g) and sufficient dehydration of the pellet by a far infrared heater in a dry box identical to that used above and the resulting dried pellet was used as a negative electrode material. Subsequently, the same procedures used in Example 1 were repeated to inspect physical properties of the resulting negative electrode material. The results thus obtained are summarized in the following Table 1.

Comparative Example 2

The same test used in Example 1 was conducted except that Si was used as the negative electrode material. The results obtained are likewise summarized in the following Table 1.

Comparative Example 3

The same test used in Example 2 was conducted except that the same negative electrode pellet used in Comparative Example 1 was employed and that the weight of the positive electrode pellet was changed to 0.06 g. The results obtained are likewise summarized in the following Table 2.

TABLE 1

| Ex. No. | Negative Electrode Material | a | b | c |
|---|---|---|---|---|
| 1 | $SiB_4$ | 82% | 1500 mAh/g | 0.5 V |
| 1* | artificial graphite | 80 | 230 | 0.4 |
| 2* | Si | 25 | 800 | 0.4 |

*: Comparative Example
a: The coulomb efficiency observed for the initial charge-discharge cycle.
b: The lithium-release capacity of the negative electrode material observed for the initial charge-dischage cycle.
c: The lithium-release voltage with respect to the counter electrode (lithium-aluminum).

TABLE 2

| Ex. No. | Negative Electrode Material | d | e |
|---|---|---|---|
| 2 | $SiB_4$ | 3.5 V | 95% |
| 3* | artificial graphite | 3.6 | 96 |

*: Comparative Example
d: Averaged discharge voltage
e: The rate of remaining discharge capacity observed for the 20th charge-discharge cycle.

$SiB_4$ shows a single stage-lithium insertion-release voltage curve like artificial graphite. On the other hand, $Li_x SiB_y$ (x is 1 to 5; y is 0.1 to 3) disclosed in J.P. KOKAI No. Sho 53-136630 have a discharge voltage lower than that of a lithium-aluminum alloy and shows several stage-lithium insertion-release voltage curve and therefore, it is clear that the compound used in the present invention is completely different from those disclosed in the foregoing patent. Moreover, the data listed in Table 1 clearly indicate that the compound used in the invention also differs from Si.

Further $SiB_4$ does not form dendrites unlike the lithium-aluminum alloy, since the pellet containing the same did not comprise any dendrite even after the charge-discharge cycles like artificial graphite.

What is claimed is:

1. A non-aqueous secondary battery which comprises a positive electrode-active material, a negative electrode material, and a non-aqueous electrolyte, wherein the negative electrode material comprises a boron-containing compound represented by the following general formula: wherein n ranges from 3.2 to 6.6.

2. The non-aqueous secondary battery of claim 1 wherein, in the foregoing general formula, n ranges from 3.2 to 4.8.

3. The non-aqueous secondary battery of claim 1 wherein the boron atom-containing compound is $SiB_4$.

4. The non-aqueous secondary battery of claim 1 wherein the solvent of the electrolyte comprises ethylene carbonate.

5. The non-aqueous secondary battery of claim 1 wherein the positive electrode-active material comprises a material selected from the group consisting of (1) $Li_xMO_2$ wherein x is 0.05 to 1.2; M is at least one member selected from the group consisting of Co, Ni, Mn and Fe, (2) a compound mainly constituted by the spinel structure and comprising at least one member selected from the group consisting of Co, Ni, Mn, Fe and "V, end (3) mixtures of (1) and (2)."

6. The non-aqueous secondary battery of claim 1 wherein the battery is provided with a means for terminating charging or discharging of said battery upon malfunction thereof.

* * * * *